United States Patent
Coloma

(10) Patent No.: US 7,542,933 B2
(45) Date of Patent: Jun. 2, 2009

(54) CERTIFICATE OF DEPOSIT PORTFOLIO SYSTEM AND METHOD

(75) Inventor: Jorge H. Coloma, Coral Gables, FL (US)

(73) Assignee: Institutional Deposits Corp., Miami, FL (US)

( * ) Notice: Subject to any disclaimer, the term of this patent is extended or adjusted under 35 U.S.C. 154(b) by 870 days.

(21) Appl. No.: 10/967,513

(22) Filed: Oct. 18, 2004

(65) Prior Publication Data

US 2005/0114246 A1 May 26, 2005

Related U.S. Application Data

(63) Continuation-in-part of application No. 10/326,937, filed on Dec. 23, 2002, now abandoned.

(60) Provisional application No. 60/351,451, filed on Jan. 28, 2002.

(51) Int. Cl.
*G06Q 40/00* (2006.01)
(52) U.S. Cl. .......................... 705/35; 705/36 R; 705/37
(58) Field of Classification Search ................ 705/36 R, 705/35, 37; 708/131–132, 134; 434/107, 434/109, 433
See application file for complete search history.

(56) References Cited

U.S. PATENT DOCUMENTS 5,631,828 A * 5/1997 Hagan ............................ 705/4
2002/0091621 A1* 7/2002 Conklin et al. ................. 705/37

OTHER PUBLICATIONS

New York Times article Merrill to Aid Sale of Bank C.D.'s published May 12, 1981, p. D4, retrieved from Proquest, Jun. 4, 2008.*

* cited by examiner

*Primary Examiner*—Mary Cheung
*Assistant Examiner*—Brian Fertig
(74) *Attorney, Agent, or Firm*—Robert J. Van Der Wall

(57) ABSTRACT

A certificate of deposit ("CD") portfolio system and method to attract institutional investors through dealers to CD issuing small to medium sized community deposit taking institutions. The central entities of the system include a system operator and a system clearing house. The system operator contacts and signs up the institutions to become a part of the system. These institutions are community banks that are too small to individually attract institutional investors. It also contacts and signs up dealers and then unitizes FDIC insured CD's into single investment instrument portfolios which the dealers then market to their institutional investor clientele. The clearing house is in communication with the system operator, the institutions and the dealers to act as an agent facilitating transactions by issuing the CD's, handling funds, settling transactions, and acting as custodian/trustee for all transactions. The invention includes a system operator controlled internet website to provide access to information to for the use of CD issuing banks, the system clearing house, the system operator and the dealers. In effect the invention creates a meeting place for small banks to pool their FDIC insured CD's together into single investment instrument portfolios large enough to attract institutional investors at favorable interest rates because of the credit enhancement resulting from full FDIC insurance of the portfolio. This is achieved because the system and method prevent exceeding the $100,000.00 FDIC insurance limit per investor per bank.

16 Claims, 2 Drawing Sheets

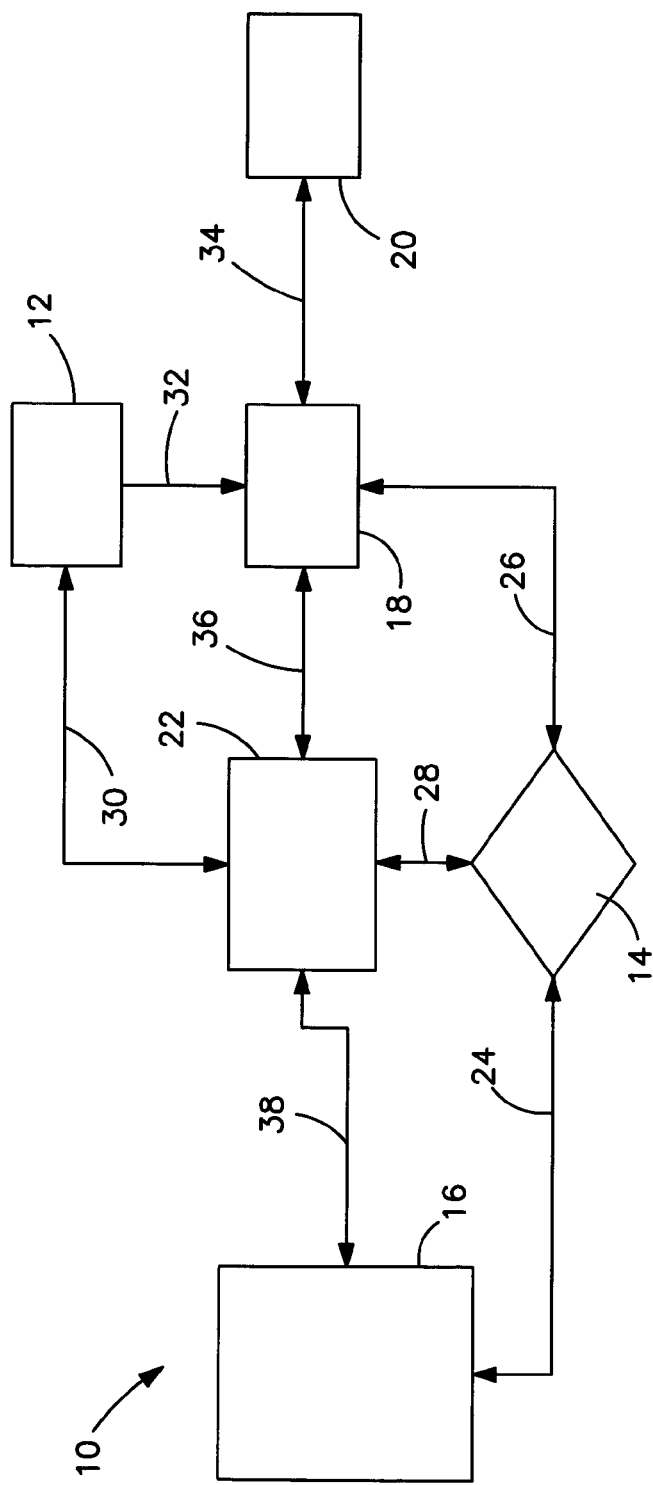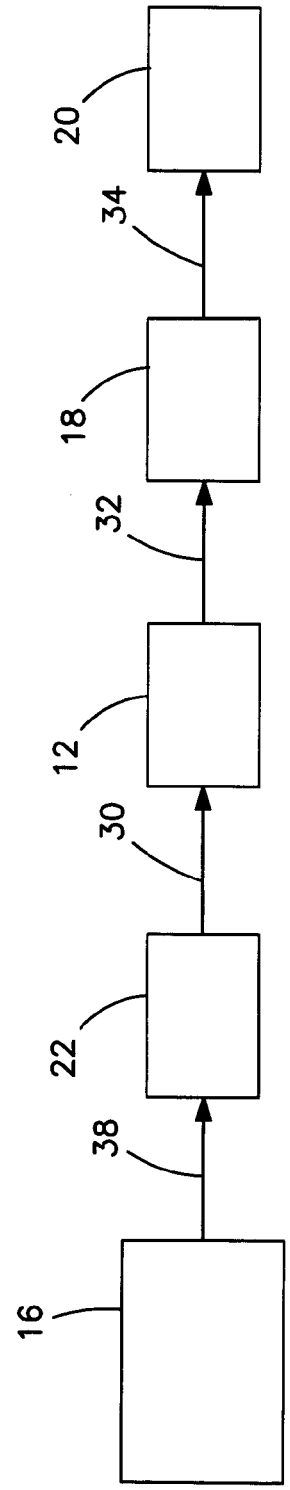

CERTIFICATE OF DEPOSIT PORTFOLIO SYSTEM AND METHOD

CROSS REFERENCE TO EARLIER APPLICATIONS

The present Application is a Continuation In Part with an earlier application having the same title, filed Dec. 23, 2002, now abandoned Ser. No. 10/326,937, which was copending with a previous provisional patent application filed Jan. 28, 2002, Ser. No. 60/351,451. The present Application claims the filing date thereof as to the common subject matter.

BACKGROUND OF THE INVENTION

1. Field of the Invention

The present invention concerns the related fields of institutional investment and deposit funding for small to medium sized community banks. More specifically, it concerns the use of certificates of deposit ("CD's") that are unitized into investment portfolios, each portfolio being a single investment instrument for purchase and sale purposes. In fact, for purposes of this application, the term "portfolio" refers to certificates that unitize underlying FDIC insured CD into single investment instruments. This definition expressly excludes the notion of a folder into which a collection of individual CD's are physically placed.

These portfolios of CD's are a unique, previously unknown investment vehicle. The invention further relates to a system that uses Federal Deposit Insurance Corporation ("FDIC") insured CD's in a maximum amount of $100,000.00 to maintain full insurance value, which creates a credit enhancement of the portfolios. The effect of this is to allow the participation of small to medium sized community banks as CD issuers who would otherwise have to pay very high rates of interest in the market to attract deposit money. The system thus results in a means to address a major problem in the banking industry, namely the lack of sufficient deposits, especially in small to medium sized community banks. More specifically, the system provides these community banks with access to the institutional capital markets for the first time.

2. Description of the Prior Art

In the past, a bank seeking deposit funding had the option to solicit such deposits from a CD broker. Thus a bank could place an order to a CD broker for say $20,000,000.00 of deposits. In such event, the broker would then need to find two hundred (200) investors at $100,000.00 each if the investment was to be fully FDIC insured. This arrangement requires that the bank issuing the CD's to pay a very high rate of interest, because the bank is competing with other banks in the market and all banks have FDIC insurance. Since this is a classic illustration of the law of supply and demand, the only way to attract deposits is by paying a higher rate of interest than the competition, some would say the highest rate of interest.

Some of the major Wall Street brokerage houses have ongoing programs to raise brokered deposits for some banks, which they then sell to their retail investors at an average of $25,000.00 per investor. Most of the Wall Street firms only deal with large banks, but nonetheless these programs require the banks issuing the CD's to pay a high rate of interest.

The only known published prior art regarding the present invention are two articles that were published over twenty (20) years ago. They are a New York Times article of May 12, 1981 ("the Times article") and a Pension & Investment Age reference of Oct. 17, 1983 that is an abstract of the article itself ("the Pension reference"). The exact content of the Pension article has not been located.

The foregoing published prior art is clearly distinguishable from the present invention. For example, when a prior art investor makes an investment of $5 million in FDIC insured CD's, it has to purchase, settle, account for, and trade the CD's as fifty (50) different transactions. Except for the present invention, there never has been a program where any institution has created a single investment instrument consisting of a pool of FDIC insured CD's and then sold that single instrument to an investor. This is a crucial difference with the present invention. Neither the Times article nor the Pension reference, nor the two in combination, either teach or suggest the creation of this novel single investment instrument, some of which constitute a new security for which Securities and Exchange Commission approval has been obtained. The facts in the marketplace support this conclusion. In the more than twenty (20) years since the referenced articles were written and even today, no person or institution has done or is doing what present invention teaches and claims.

SUMMARY OF THE INVENTION

In the present system, small to medium sized community banks are contacted by the system operator and invited to participate in the inventive program to attract deposits through the issuance of CD's that will be unitized into investment portfolios, each portfolio being a single investment instrument for purchase and sale purposes. Those that wish to participate will issue CD's according to certain procedures, and will provide a term sheet with rates and the like. Using the prior art numbers, two hundred (200) banks are FDIC insured $100,000.00 CD issuers in order to create a package of $20,000,000.00. This can then be sold to one institutional investor in one transaction using a single investment instrument. By extrapolation, this means that creating a customer base of two hundred institutional investors, each willing to invest $20,000,000.00, it is possible to accommodate the deposit needs of two hundred (200) banks at $20,000,000.00 each for a total placement of $4,000,000,000.00. With the present invention, that means the placement of $4,000,000,000.00 that is completely FDIC insured using only 200 investment instruments. The prior art cannot do that.

From the perspective of the institutional investor said investor is able to purchase, in a single transaction, a portfolio of individual CD's which are issued by community small to medium sized banks in an amount not to exceed $100,000 per bank per investor. If the institutional investor purchases a portfolio worth $20,000,000.00, that investor receives a diversified portfolio of 200 CD's issued by two hundred (200) different banks, but it is not a portfolio of individual CD's, it is a single investment instrument that is equal to the 200 CD's. Each individual bank issuing a CD backs that CD and, more importantly, each is individually insured by FDIC because the amount is limited to the $100,000 FDIC insurance limit per bank per investor. This is similar to buying a bond that is collateralized by other assets such as credit card receivables, automobile loans or mortgages, the difference being that debt instrument of the present invention is of a much superior credit quality because it is comprised entirely of FDIC insured components.

Reflecting back upon the prior art, in order for an institutional investor who previously has structured such a transaction, the investor would have to make 200 individual CD purchases, one from each separate banking institution. The amount of work involved in doing so certainly does not compensate for the additional pick up in yield. Using the present invention, a very attractive unique investment vehicle is created for small to medium sized community banks, because instead of paying under the prior art the highest or a very high rate of interest in the market to attract deposits, the inventive system is able to package together a number of such institutions, taking advantage of the credit enhancement created by the FDIC insurance that each of the banks already has and thus attract deposits to the customer banks at a lower cost. In effect a meeting place is created under the inventive system where FDIC insured banks come together for the purpose of offering portfolios of FDIC insured CD's or that invest $90,000 to $20,000,000.00 or more at a time in FDIC insured CD's. The meeting place is the website of the system operator. What is unique is that the system proposes the delivery of a single instrument portfolio in one transaction as opposed to a great many transactions that are inefficient. Put in another way, the present inventive system enables small to medium sized community banks to pull together to issue multimillion dollar single instrument packages of FDIC insured CD's to a new client base, i.e., institutional investors, who have been unapproachable by such banks previously. In the prior art, large institutional investors would not invest in CD's issued by small and medium sized financial institutions, because the individual banks' capacity is too small to attract such investors, and there existed no mechanism for the individual small institutions to pool their CD's into a single investment instrument that the institutional investor could buy in a single transaction.

In accordance with a major aspect to the present invention, there are five primary components to the system:

1. The system operator is responsible for signing up bank issuers, developing a network of institutional buyers, and originating the transactions.

2. Small to medium sized community banks are the CD issuers. These CD issuers must be well capitalized banks, savings banks, savings and loan associations and other deposit taking institutions.

3. Dealers who are responsible to market portfolios of CD's to their institutional investor clients.

4. A system clearing house having the responsibility to act as an agent to issue the CD's, handle funds, settle transactions, and to act as custodian/trustee for all transactions. The system clearing house is preferably a large bank agreeing to act in this capacity.

5. An online system website to provide access to information to result in completed transactions for the use of CD issuers, the system clearing house, the system operator and the dealers.

Further, although not a component of the inventive system, per se, the system interacts for some purposes with the Depository Trust Company ("DTC"), because some of the portfolios are unitized into single instrument Unit Investment Trusts ("UIT's") which are recognized as securities by the Securities and Exchange Commission ("SEC"). A UIT is a single investment instrument evidencing beneficial ownership in a pool of FDIC insured certificates of deposit issued by well capitalized banks, savings banks, savings and loan associations and other deposit taking institutions, referred to as issuers. The trusts are sold under SEC Rule 144A as an exemption to registration. UIT's are single investment instrument that represent portfolios of CD's to be sold only to Qualified Institutional Buyers, which are in part defined by the SEC to be owners of at least $100 million in assets and having a net worth of not less than $25 million. The DTC is the world's largest securities depository and is a national clearing house for the settlement of trades in corporate, municipal and mortgage-backed securities and performs asset services for its participating banks and broker/dealers. The DTC network links more than 11,000 broker/dealers, custodian banks, and institutional investors, as well as transfer agents, paying agents, and exchange and redemption agents for securities issuers. DTC is a member of the Federal Reserve System and a registered clearing agency with the SEC.

Specifically in regard to the present invention DTC serves as the custodian of the UIT's upon initial issuance of them and their sale through the inventive system. The DTC serves as the national clearing house for the issuance of the UIT's, and for the subsequent purchase and sale transactions in those securities by secondary market investors. The initial sale of UIT's is recorded in book-entry form, with the DTC securities management system. Thereafter, all purchase and sale transactions involving those securities are communicated to the DTC by the transacting parties for recordation, in book entry form, within the DTC system. The separate system clearing house, as the trustee, and receiving, paying and distribution agent in the inventive system, makes payment for dividends and instrument maturities to DTC, which, in turn, then distributes the proceeds to the appropriate beneficial owners reflected in the DTC system.

The inventive system also employs another type of CD portfolio called a Certificate of Deposit Agency Portfolio ("CDAP"). It is expected the DTC will in the future handle CDAP's as well as UIT's, but because the SEC has not yet approved CDAP's as a new product, the DTC as of this writing is not handling CDAP's, which is done instead through the system clearing house.

In accordance with another aspect of the invention, there is provided a method for the operation of the inventive system. The following steps are contemplated. First, the system operator contacts a bank which agrees to participate and signs up to issue CD's as a part of the method. Next, dealers are signed up by the system operator and they access the system to get information on the availability of the product and its terms and yields. Amounts from $90,000.00 to $20,000,000.00 or more can be invested in a single transaction. This is accomplished by placing the funds across many participating bank issuers, all of which are solicited to become a part of the method by the system operator. Because no more than $100,000.00 can be deposited in a given bank in a particular transaction (to a single investor) in order to maintain the FDIC insurance, the method contemplates tracking the institutions that issued CD's for a given institutional investor. Thus, if a dealer does a transaction of $1,000,000.00 for a specific institutional investor, the next time that the dealer initiates a transaction for the same investor, the system blocks the names of the specific institutions in which the dealer's institutional investor had previously invested so long as the CD's are still outstanding. This prevents exceeding the $100,000.00 limit to maintain full FDIC insurance.

The method further contemplates allowing the system clearing house to receive information about a transaction, being able to sell the transaction, receiving the funds from the institutional investors, wiring no more than $100,000.00 to each issuing banking institution for each investor, issuing CD's in book entry form, providing custody services or delivering the book entry CD to a different custodian. With the information provided by all parties, the inventive system is able to automatically prepare all wire transfers involved in the transaction. The system clearing house confirms a specific transaction for a total amount and provides details of the individual CD's to the investors. At maturity, the system clearing house also provides the money from each individual issuing institution and makes a single payment to the single institutional investor for both the principal and the interest, less of course the charges paid to the system operator. When the portfolio is a recognized security such as a UIT, the payment is processed through DTC as described above. The method further contemplates the computerization of all of these steps so that all the foregoing takes place automatically and almost instantaneously in a matter of seconds.

Bearing in mind the foregoing, it is a principal object of the present invention to create a system that constitutes an electronic meeting place where small and medium sized community banks can join forces to access a customer base of institutional investors as in capital markets that will be willing to purchase multimillion dollar packages of $100,000.00 FDIC insured CD's in a single transaction using a single investment instrument.

A related object of the invention is to provide the opportunity for an institutional investor to purchase a package of from $90,000.00 to multimillions of dollars in a form of new investment vehicle in a single instrument that represents multiple certificates of deposits issued by multiple small to medium sized community banking institutions using FDIC insured CD's not exceeding $100,000.00 each wherein the entire invested sum is FDIC insured.

Another related object of the invention is the ability to package together into a single investment instrument a plurality of small to medium sized banking institution issued CD's in a maximum amount of $100,000.00 each to preserve FDIC insurance to take advantage of the credit enhancement created thereby.

A further related object of the invention is the ability to attract deposits at a lower cost to the small to medium sized community banks because of the avoidance of the necessity to procure deposits through a CD broker at very high interest rates.

An additional object of the invention is a system which provides the opportunity for community banks to achieve alternate sources of funding by pulling together to issue multimillion dollar portfolios of FDIC insured CD's in the form of a single investment instrument to a client base previously unavailable in the form of institutional investors because such individual community banks are too small to attract such investors in the absence of the pooling effort, and the resulting unitization of the FDIC insured CD's into a single investment instrument.

Another object of the invention is to provide a system and method that automatically prevents the issuance of a CD to a previous investor when doing so would exceed the $100,000.00 FDIC insurance limit.

Other objects and advantages will become apparent to those skilled in the art upon reference to the following descriptions and the appended drawings.

BRIEF DESCRIPTION OF THE DRAWINGS

FIG. 1 is a block diagram showing the system entities and the more significant aspects of the overall transaction from term sheet to settlement date.

FIG. 2 is a block diagram showing the flow of funds at maturity, especially the steps and parties involved in the settlement of a CD UIT at its maturity.

DETAILED DESCRIPTION OF THE PREFERRED EMBODIMENTS

Figure 3:
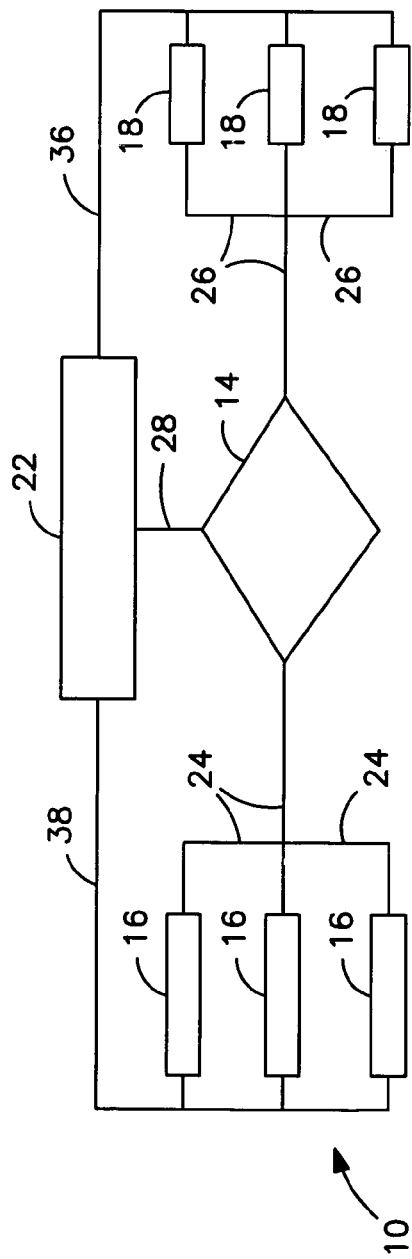
FIG. 3 is a block diagram showing certain system entities and steps involved in signing up participating issuers of CD's, the process whereby dealers join the inventive system, and the process by which issuer term sheets are created.

As required, detailed embodiments of the present invention are disclosed herein; however, it is to be understood that the disclosed embodiments are merely exemplary of the invention which makes the embodied in various forms. Therefore, specifics structural and functional details disclosed herein are not to be interpreted as limiting, but merely as basis for the claims and as representative basis for teaching one skilled in the art to variously employed the present invention in virtually any appropriately detailed structure. References now made to the drawing, wherein like characteristics and figures of the present invention shown in the various figures are designated by the same reference numerals.

FIG. 1 is a block diagram showing the system 10 entities and the more significant aspects of the overall transaction from term sheet to settlement date. Shown are the five primary entities in the system 10 plus the preexisting DTC 12, with which the system 10 interacts. The system 10 begins with the system operator 14 being responsible for signing up bank issuers 16, developing a network of dealers 18 and institutional investors 20, and originating the transactions. The CD issuers 16 are small to medium sized community banks and they must be well capitalized banks, savings banks, savings and loan associations and other deposit taking institutions. The dealers 18 are responsible to market portfolios of CD's unitized into single investment instruments to their institutional investor clients.

An important part of the invention is the system clearing house 22 which has the responsibility to act as an agent to issue the CD's, handle funds, settle transactions, and to act as custodian/trustee for all transactions. The system clearing house 22 is preferably a large bank agreeing to act in this capacity. The system operator 14 includes a website to provide access to information to result in completed transactions for the use of CD issuers 16, the system clearing house 22, the system operator 14 and the dealers 18.

The system operator 14 in signing up CD issuers 16 provides information and term sheets at 24. The system operator 14 develops a network of dealers 18 by providing information and receiving orders at 26. The system operator 14 provides settlement instructions at 28 to the system clearing house 22. When the investment vehicle is a UIT, settlement at maturity is made by the system clearing house 22 providing instructions at 30 to the DTC 12 which disburses the proceeds at 32 to the dealers 18, who then disburse the proceeds at 34 to the institutional investors 20. At the point of purchase of portfolios in the form of unitized single investment instruments, the funds move from the investors 20 to the dealers 18 at 34, thence from the dealers 18 to the system clearing house 22 at 36, and thence from the system clearing house 22 to the CD issuers 16 at 38.

FIG. 2 shows the funds flow at the time of maturity when the CD portfolio is a UIT. The CD issuer 16 provides funds to the system clearing house 22 at 38, the system clearing house 22 provides an instructional wire at 30 to the DTC 12 which disburses the proceeds at 32 to the dealers 18, who then disburse the proceeds at 34 to the institutional investors 20. This is also the procedure that is contemplated when a CDAP is approved by the SEC as an investment security at some point in the future. At present, however, a CDAP at maturity results in the following flow of funds as seen in FIG. 1. The CD issuer 16 provides funds to the system clearing house 22 at 38, the system clearing house 22 disburses the proceeds at 32 to the dealer 18, who then disburses the proceeds at 34 to the institutional investors 20.

Viewing the invention from the standpoint of its method of operation the following operations are contemplated, beginning with FIG. 3. The system operator 14 approaches candidate banks 16 at 24 and sends them an application package which invites them to join the inventive system. Participating issuing institutions 16, ordinarily small to medium sized community banks, complete their application forms and send them at 38 to the system clearing house 22 for execution. The system clearing house 22 provides a copy of the issuer agreement to the system operator 14 at 28. The system operator 14 begins activation of the issuer 16 in the system 10 and confirms with the system clearing house 22 the account number of the new issuer 16 which must correspond with a FDIC number. Once the issuer agreement is executed and its information is on the system, the system operator 14 sends the issuer 16 a welcome package explaining how the system operates in more detail. In addition, a primary contact form is sent to the issuer for it to designate a primary contact to handle all system related affairs and the issuer's pertinent information. The system clearing house 22 also notifies the issuing institutions 16 of the execution of the agreement and furnishes them with a copy thereof at 38. Based on the data provided in the primary contact form, the system operator 14 staff proceeds to contact the issuing institution 16 and finalize its account setup with adequate user name, password, and preferences. This procedure signs up the issuing institution 16 and sets it up system wide to offer CD's through the system operator 14. All they need is to execute a term sheet which will activate that institution's commitment to offer CD's through the system 10.

The system operator 14 also approaches candidate dealers 18 and sends them at 26 an application package to invite them to join the inventive system. The respective dealers 18 complete their application forms and send them to the system clearing house 22 at 36 for execution. The system clearing house forwards a copy of the dealer agreement to the system operator 14 at 28, whereupon the system operator 14 begins activation of the dealer in the operative system 10 and informs the system clearing house 22 at 28 of the account number of the new dealer 18. Once the dealer agreement is executed and the dealer's information is on the system, the system operator 14 will send the dealer 18 at 26 a welcome package explaining the system 10 operation in more detail. In addition, a primary contact form is sent to the dealer 18 for it to designate a primary contact to handle all system dealer related affairs and provide pertinent dealer information. The system clearing house 22 also notifies at 36 the dealer 18 of the execution of the agreement and provides it with a copy thereof. Based on the data provided in the primary contact form, the system operator 14 staff proceeds to contact the dealer 18 and finalize its account setup with adequate user name, password, and authorized sales staff numbers within the dealer firm and preferences.

Figure 4:
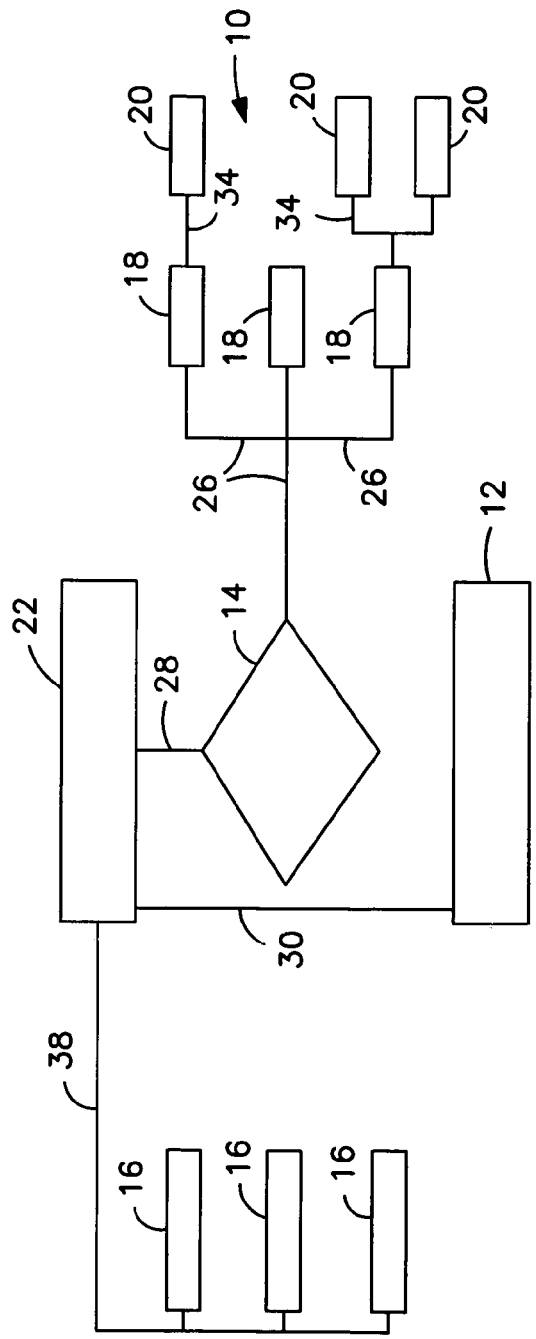
FIG. 4 is a block diagram illustrating certain system entities and including especially a system dealer and a method for creation of a subaccount, how the method is viewed from the standpoint of the investor, and the purchase and settlement of a CD Unit Investment Trust ("UIT").

FIG. 4 is a block diagram illustrating certain system entities and including especially dealers 18 and a method for creation of subaccounts. The dealer 18 contacts at 26 the system operator 14 with the intention of creating subaccounts for its staff members who will sell UIT's to their client base of investors 20. The system operator 14 as sponsor of the CD Unit Investment Trust ("UIT") program offers for sale ownership units in the UIT program through its controlled affiliates, registered broker dealers 18, selling at 34 to qualified institutional buyers 20 as defined by SEC regulations. CD's backing each trust are issued at 28 to the system clearing house 22 as trustee, investors purchase such UIT certificates through their own dealer representative 18. The UIT certificates must be DTC-eligible with a unique CUSIP number and each UIT is backed by CD's with similar coupon rates and maturities. At maturity of the CD's backing each UIT, the issuers 16 of the CD's transfer payment of principal and accrued interest to the trustee (system clearing house) 22 for credit to the investor. See FIG. 2. The dealer 18, who has contacted the system operator 14 regarding its intention to create subaccounts for its staff can then sell UIT's to the dealer's client base 20.

Authorized dealer 18 firm personnel can at this point create subaccounts for each their individual institutional investor clients 20. Each of these accounts can have the ultimate UIT holder information, or it can be confidential depending on what the dealer 18 prefers. The system operator 14 only requires a subaccount number to identify the investor 20 which is also provided by the dealer 18. The dealer can also input the ultimate UIT holder's account information into the system operator's website 14 to track its UIT certificates and enable various filter mechanisms for bank assignment to prevent exceeding the maximum FDIC insured limit of $100,000. At this point an authorized dealer 18 or the ultimate UIT holder 20 can log onto the system operator's website 14 and exclude certain banks from the institutions available that cannot be a part of a UIT. Thus specific institutions 16 or even states can be excluded or blocked. At this point an authorized dealer 18 is able to make a purchase for one of its created subaccounts.

An issuer 16 interested in offering CD's through the inventive system proceeds to informs the system operator 14 of that fact. See FIG. 3. This may be accomplished at 24 by phone, fax, e-mail or directly through the system operator's website 14. No CD's of any kind will be made available for sale unless the system operator 14 has received a properly executed term sheet. The system operator's staff 14 gets in touch at 24 with the bank issuer 16 and together they determine what is the best rate, term, and dates for the issuer 16. The system operator staff 14 will then send at 24 a properly completely term sheet to the issuer 16, unless that issuer 16 has already sent one for approval. Once the properly completed and executed term sheet has been received by the system operator 14, its staff will enter the term sheet into the system as part of the available inventory. The issuer 16 receives notification from the system operator 14 that its term sheet is live on the inventive system. The issuer 16 can now call for additional support if needed or see the status of its term sheet online using a system operator's website 14.

The method when viewed from the standpoint of the investor includes the following operations. See FIG. 4. Initially an investor 20 informs at 34 his dealer 18 that he wishes to purchase a UIT. The dealer 18 in turn communicates at 26 with the system operator 14 informing the system operator 14 that the dealer 16 has an institutional investor client 20 that wishes to purchase an UIT. The system operator 14 and the dealer 18 determine if the new potential investor (ultimate holder of a UIT) currently has a subaccount assigned to that investor 20 within that dealer 18 organization. If the investor 20 has an existing subaccount, the system operator 14 can proceed to initiate the creation of the UIT. If the investor 20 does not have an existing system 10 subaccount, then one must be created for that investor 20. The dealer 18 will then send a UIT request form at 26 to the system operator 14 for processing, this can be done by telephone or directly online by the dealer 18. The system operator 14 informs the dealer 18 of the details of the UIT that has been created as a result, including the purchase price, rate, etc. for customer (institutional investor) approval. The dealer 18 confirms to the system operator 14 that the UIT is approved and the purchase is completed. Thereafter the system operator 14 creates the UIT entry in its website database and automatically notifies all parties involved about the new UIT. The dealer 18 receives an order confirmation stating all the details about the UIT, including settlement date, pending money wire amount, and list of each individual bank CD's that backs the UIT. The system clearing house 22 receives a notification at 28 from the system operator 14 with instructions on the new UIT and how to process the transaction. Meanwhile each issuer bank 16 receives notification stating that a CD is being issued on their behalf, in accordance with the term sheets they have opened in the inventive system 10. Settlement of a transaction takes two working days after purchase confirmation of the UIT. During this time the dealer 18 wires the pending funds of the purchase price to the system clearing house 22 on the settlement date. The system clearing house 22 will then issue the CD's, and then create and deliver the UIT certificate at 30 to the DTC 12 for the dealer's account. Finally, the system clearing house 22 will divide the wire funds according to the instructions provided at 28 by the system operator 14 and wire the funds at 38 respectively to the issuers 16 in accordance with the issued CD's within that UIT. The result is that the transaction has been settled.

At maturity, one day before a UIT's maturity date, the system clearing house 22 will initiate at 38 an automated clearing house (ACH) debit to each issuing bank 16 that is backing the UIT. See FIG. 2. The ACH initiated by the system clearing house 22 the day before maturity is concluded by maturity date and the funds are in the hands of the system clearing house 22. The system clearing house 22 now proceeds to deposit any outstanding transaction balances and fees into the system operator's account at the system clearing house 22. The system clearing house 22 then proceeds to deliver the UIT funds to DTC 12. The DTC 12 then pays the beneficial owner 20 through the dealer 18 and the UIT transaction is thus settled.

While the invention has been described, disclosed, illustrated and shown in various terms or certain embodiments or modifications which it has assumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

What is claimed is:

1. A system operator computer-implemented process of creating, issuing and holding a certificate identifying a unique specific portfolio of assets in the form of certificates of deposit ("CD's") in an agency format so that there is a transferable structure of legal ownership of the portfolio of assets which is attributed to a holder of the certificate, not an entity holding the portfolio of assets, the process comprising the following steps:
   communicating financially with CD-issuing deposit taking institutions ("bank issuers");
   unitizing CD's issued by said bank issuers into a portfolio of FDIC insured CD's called a Certificate of Deposit Agency Portfolio ("CDAP") by said system operator computer;
   delivering and trading said CDAP's through an exchange clearing house, with each CDAP being a single investment instrument for purchase and sale purposes;
   customizing, by the system operator computer, each CDAP for each investor such that each investor is assured that there will be no overlap in FDIC insurance contained within the CDAP, including blocking inclusion of CD's from any bank issuer whose CD's are held by the investor in any other CDAP (or any other instrument registered with the system operator) based on computer reference to a master database maintained in the system operator computer;
   the system operator marketing CDAP's to the investors using the system operator computer;
   providing a system clearing house in financial communication with the exchange clearing house, the system operator, and the bank issuers to act as an agent facilitating transactions; and
   providing an internet website to provide on-line information and communications among the system operator, the system clearing house, the exchange clearing house, the bank issuers and the investors.

2. The process of claim 1 in which the CDAP's are created and receipts issued by the system clearing house for handling funds, settling transactions, and acting as custodian for all transactions.

3. The process of claim 1 in which the system operator signs up bank issuers using agreements to be a part of the system.

4. The process of claim 3 in which the agreements are provided by the bank issuers to the system clearing house for execution.

5. The process of claim 4 in which the system clearing house provides copies of the agreements to the system operator.

6. The process of claim 1 in which the system operator obtains term sheets from the bank issuers to facilitate creating CDAP's that are backed by CD's having like terms.

7. The process of claim 1 in which the system operator computer customizes the CDAP to prevent investment from exceeding an FDIC insurance limit in a given bank issuer by a given investor so that all CDAP's are fully FDIC insured.

8. The process of claim 1 in which the settlement of transactions involving CDAP's is made through the exchange clearing house.

9. A method of attracting investors to CD issuing deposit taking institutions ("bank issuers") using a system operator computer-implemented process of creating, issuing and holding a certificate identifying a unique specific portfolio of assets in the form of certificates of deposit ("CD's") in an agency format so that there is a transferable structure of legal ownership of the portfolio of assets which is attributed to a holder of the certificate, not an entity holding the portfolio of assets, the method comprising the following steps:
   communicating financially with the bank issuers;
   unitizing CD's issued by said bank issuers into a portfolio of FDIC insured CD's called a Certificate of Deposit Agency Portfolio ("CDAP") by said system operator computer;
   delivering and trading said CDAP's through an exchange clearing house with each CDAP being a single investment instrument for purchase and sale purposes;
   customizing, by the system operator computer, each CDAP such that each investor is assured that there will be no overlap in FDIC insurance contained within the CDAP, including blocking inclusion of CD's from any bank issuer whose CD's are held by the investor in any other CDAP (or any other instrument registered with the system operator) based on computer reference to a master database maintained in the system operator computer;

the system operator marketing by the system operator computer the CDAP's to the investors;

providing a system clearing house in financial communication with the exchange clearing house, the system operator, and the bank issuers to act as an agent facilitating transactions; and providing on line information and communications capabilities among the bank issuers, the system operator, the exchange clearing house, the system clearing house, and the investors using an internet website whereby specific bank issuers are notified that investors have been attracted using the foregoing method.

10. The method of claim 9 which further comprises using the system clearing house to issue receipts for the CDAP's, handle funds, settle transactions, and to act as custodian for all transactions.

11. The method of claim 9 which further comprises signing up bank issuers using agreements to be a part of the system.

12. The method of claim 11 which further comprises providing the agreements to the system clearing house for execution.

13. The method of claim 12 which further comprises furnishing copies of the agreements to the system operator.

14. The method of claim 9 which further comprises obtaining term sheets from the bank issuers to facilitate creating CDAP's as a single deliverable instrument backed by CD's having like terms.

15. The method of claim 9 which further comprises the system operator's computer customizing the CDAP to prevent investment from exceeding an FDIC insurance limit in a given bank issuer by a given investor so that all CDAP's are fully FDIC insured.

16. The method of claim 9 which further comprises settling transactions involving CDAP's through the exchange clearing house.

* * * * *